United States Patent
Nunez-Barranco Patino

(10) Patent No.: US 9,378,889 B2
(45) Date of Patent: Jun. 28, 2016

(54) THREE-PHASE CAPACITOR FORMED BY TWO ALIGNED CYLINDERS WITH OVERPRESSURE DISCONNECTION

(75) Inventor: Cesar Nunez-Barranco Patino, Madrid (ES)

(73) Assignee: RTR Enorgia, S.L., Pinto (Madrid) (ES)

( * ) Notice: Subject to any disclaimer, the term of this patent is extended or adjusted under 35 U.S.C. 154(b) by 257 days.

(21) Appl. No.: 13/995,763

(22) PCT Filed: Jul. 27, 2012

(86) PCT No.: PCT/ES2012/070581
§ 371 (c)(1),
(2), (4) Date: Jun. 19, 2013

(87) PCT Pub. No.: WO2013/104808
PCT Pub. Date: Jul. 18, 2013

(65) Prior Publication Data
US 2014/0177124 A1    Jun. 26, 2014

(51) Int. Cl.
*H01G 2/00* (2006.01)
*H01G 4/32* (2006.01)
*H01G 4/38* (2006.01)

(52) U.S. Cl.
CPC . *H01G 2/00* (2013.01); *H01G 4/32* (2013.01); *H01G 4/38* (2013.01); *H01G 4/385* (2013.01)

(58) Field of Classification Search
CPC ............. H01G 2/18; H01G 2/00; H01G 2/14; H01G 4/32; H01G 4/38; H01G 4/385
See application file for complete search history.

(56) References Cited

U.S. PATENT DOCUMENTS

| | | | | |
|---|---|---|---|---|
| 5,313,360 A | * | 5/1994 | Stockman | 361/328 |
| 2013/0194712 A1 | * | 8/2013 | Lavene et al. | 361/274.1 |
| 2014/0111903 A1 | * | 4/2014 | Reinbold | 361/301.5 |

FOREIGN PATENT DOCUMENTS

| | | |
|---|---|---|
| DE | 20051045978 | 3/2007 |
| EP | 1076106 | 2/2012 |

OTHER PUBLICATIONS

International Search Report, dated Apr. 19, 2013.

\* cited by examiner

*Primary Examiner* — David M Sinclair
(74) *Attorney, Agent, or Firm* — Dickinson Wright PLLC

(57) ABSTRACT

Three-phase capacitor formed by two cylinders where each of the cylinders comprises an outer part which corresponds to a capacitor (1) and (2) while the inner part of each cylinder corresponds to a capacitor (3) and (3') and which are connected in delta with phases (A), (B) and (C), where each capacitor is separated from the adjacent of each cylinder by means of an insulating material which allows the movement of the inner part with respect to the outer one of each cylinder in case of overpressure, which causes the breakage of the connections made in a particular manner, the breakage of the conductive coating layer (7) which connects armatures (3.1) and (1.2); the breakage of the conductive coating layer (8) which connected armatures (2.2) and (3'.2), the breakage of the connection of connection cable (6) with phase (C), serving as an effective means of protection against internal overpressures.

8 Claims, 4 Drawing Sheets

THREE-PHASE CAPACITOR FORMED BY TWO ALIGNED CYLINDERS WITH OVERPRESSURE DISCONNECTION

CROSS-REFERENCE TO RELATED APPLICATION

This U.S. National Stage Patent Application claims the benefit of International Application serial number PCT/ES2012/070581 filed Jul. 27, 2012, the entire disclosure of the application being considered part of the disclosure of this application.

OBJECT OF THE INVENTION

The object of the present invention is, as noted by the title of the invention, a three-phase capacitor formed by two cylinders having overpressure disconnection means by displacement of internal coils.

The present invention characterizes the special configuration and design of the three-phase capacitor, and particularly the fact that it is formed by two alike cylinders arranged in an aligned manner—with the same axis and having constructive features both of capacitors and their connections so they provide the three-phase power capacitor with effective means of disconnection in case of overpressure by displacement of internal coils.

Therefore, the present invention lies within the scope of fixed capacitors, and particularly of rolled capacitors, where metal armatures are rolled on a sheet of dielectric material to form a compact cylinder which is usually inserted into a metal capsule and finally waterproofs with a filling to protect it from moisture, oxidation and electric effects, or by using gas.

BACKGROUND OF THE INVENTION

Capacitors are usually encapsulated in aluminium cans and have overvoltage protection means consisting of a perimeter recess in the form of tab in the proximity of their upper end, such that in case of overpressure inside the aluminium can, said tab expands by absorbing the energy generated, in addition to causing disconnection of connection terminals and preventing the explosion of the capacitor, which tend to be quite spectacular.

Although this overpressure protection means meets the purposes set forth, in the case of using three-phase capacitors formed by two cylinders aligned along their axis, the protection is not as effective as might be expected for the constructive nature of the capacitor.

Therefore, the object of the present invention is to develop a three-phase power capacitor formed by two cylinders aligned along their axis, having effective overvoltage protection means other than the known ones, developing a capacitor as the one that follows and contained in its essence in the first claim.

DESCRIPTION OF THE INVENTION

The capacitor object of the invention is a three-phase capacitor which consists of two cylinders aligned along their axis, where each cylinder has two concentric parts housed one inside the other, the outer parts of each cylinder corresponding to a capacitor of one of the phases, while each of the inner parts of the cylinders corresponds to half of the capacitor of the phase missing, the inner parts being connected in parallel.

Each of the capacitors of each cylinder is separated from the adjacent one by a smooth insulating material with hardly any friction coefficient such that the inner part can be moved with respect to the outer one in case of an internal overpressure.

The upper parts of each of the cylinders form one of the connection armatures of each of the capacitors formed, while the lower parts of each of the cylinders form the other armature of each of the capacitors and are attached to each other by a lower conductive layer which puts the corresponding armatures at the same potential.

The object of the invention are the means of protection against internal overpressure of this type of capacitors which are based on two concurrent and necessary facts, on the one hand, the insulating material which covers and separates each capacitor from the adjacent one, such that in case of overpressure the inner part of each cylinder can slide on the outer part, and on the other hand the contacts that take place between the different parts and capacitors that form the assembly, such that upon a displacement of the inner parts of the cylinders with respect to the outer parts, a breakage of the contacts made occurs, leaving the three-phase capacitor without electrical connection.

As mentioned above the three-phase capacitor consists of two cylinders aligned along their axis, each cylinder being formed by two parts arranged concentrically, an inner one in the form of cylinder, and an outer one in the form of annulus which surrounds the inner one, where the outer part corresponds to the capacitor of one of the phases while the inner part corresponds to half of another one of the capacitors of another one of the phases, this half being completed with the half provided on the other cylinder.

EXPLANATION OF FIGURES

In order to complement the description that follows and in order to help a better understanding of its features, a set of plans is herein appended whose figures, by way of illustration and not restrictively, represent the most significant details of the invention.

PREFERRED EMBODIMENT OF THE INVENTION

In view of the figures a preferred embodiment of the proposed invention is next described.

Figure 1:
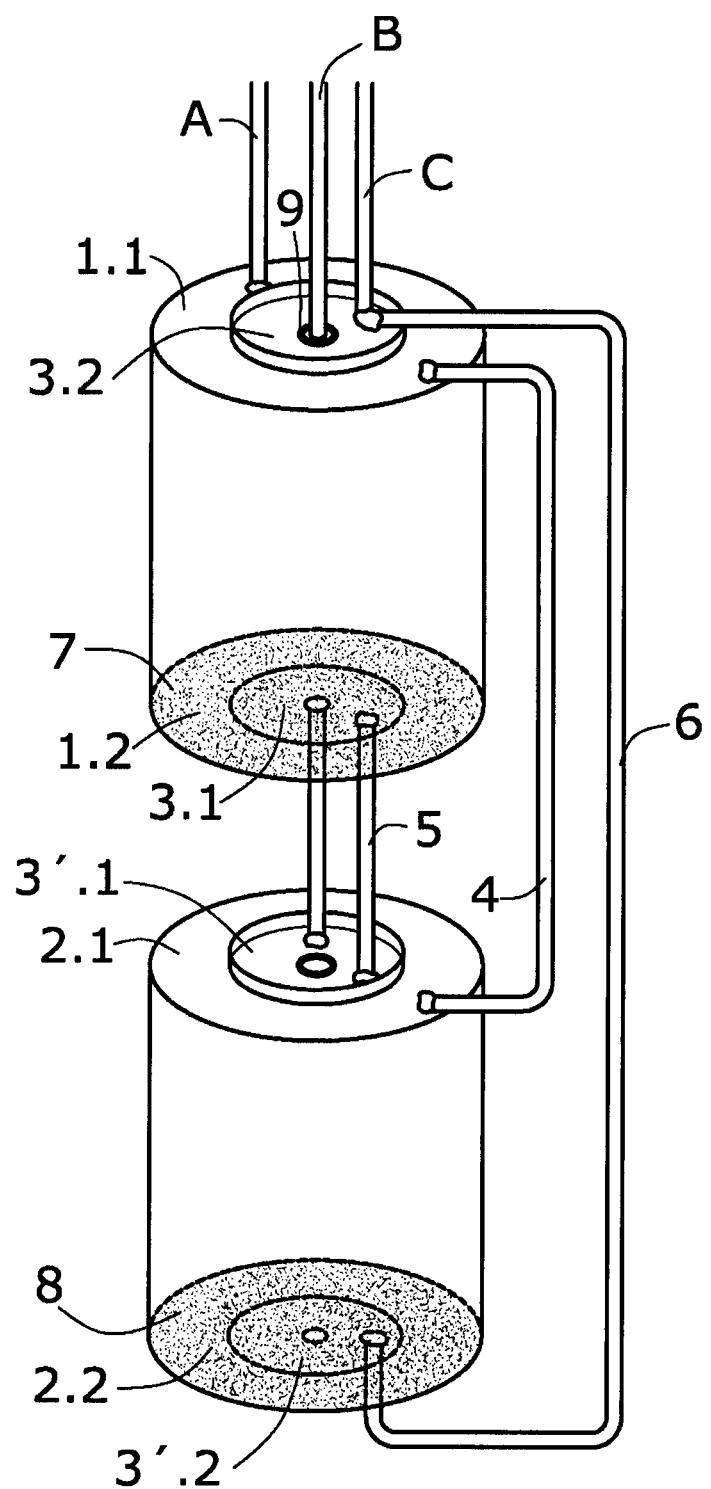
FIG. 1 shows a perspective representation of the three-phase capacitor formed by two cylinders object of the invention and the connections made between the different parts.

In FIG. 1 it can be seen that the capacitor is formed by two cylinders, a first cylinder and a second cylinder which in a possible embodiment might be arranged such that their axes are aligned.

Figure 2:
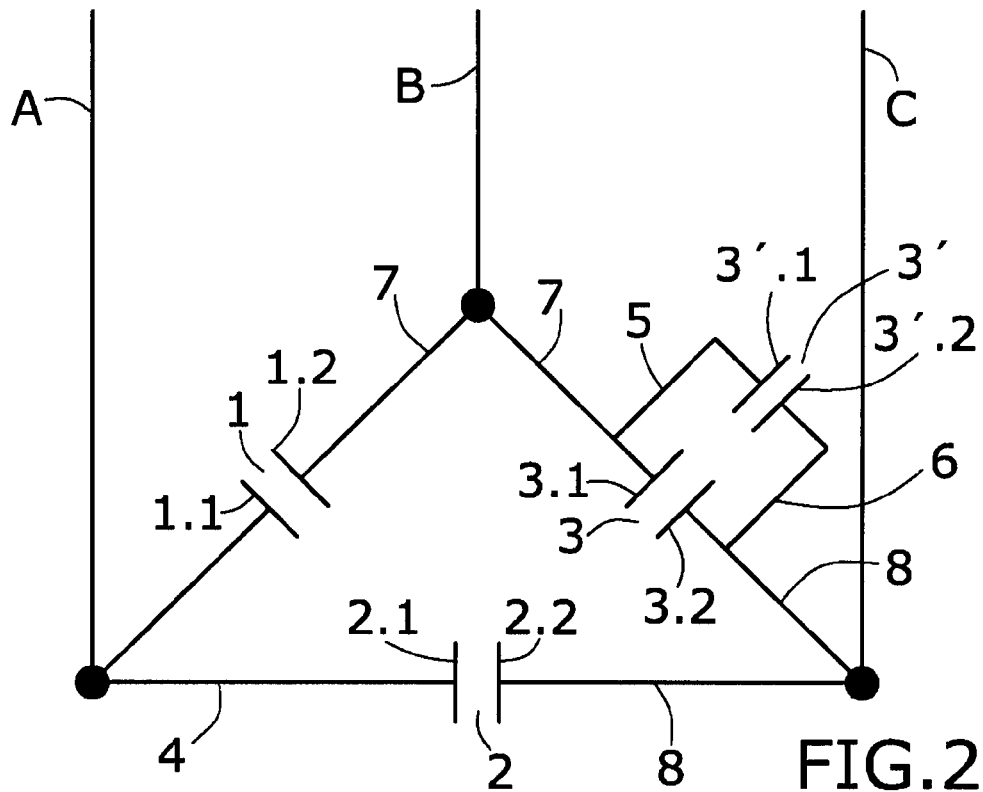
FIG. 2 shows the equivalent electrical diagram of the construction shown in FIG. 1.

In FIG. 2 the equivalent electrical diagram can be seen showing that the three-phase capacitor object of the invention has four capacitors. A capacitor (1) connected between phases (A) and (B), a capacitor (2), connected between phases (A) and (C) and two capacitors in parallel (3) and (3'), connected between phases (B) and (C), and of equivalent value to capacitors (1) and (2). All capacitors connected such that they form a delta connection, to phases (A), (B) and (C).

Capacitor (1), has two armatures (1.1) and (1.2) connected to phases (A) and (B) respectively; capacitor (2), has its corresponding armatures (2.1) and (2.2), connected to phases (A) and (C) respectively, while capacitor (3) has its armatures (3.1) and (3.2) connected in parallel to armatures (3'.1) and (3'.2) of capacitor (3') and in turn the set of the two capacitors in parallel (3) and (3') to phases (B) and (C).

The upper cylinder, or represented on the top of FIG. 1, includes an outer part corresponding to capacitor (1), which has an armature (1.1) on the top, and on which phase (A) is connected, and the other armature (1.2) at the bottom and electrically connected with armature (3.1) by means of a coating (7) which connects electrically both armatures in spite of the insulation layer, the gap that exists between the two armatures (1.2) and (3.1) which is then covered by joining electrically both armatures by the coating layer (7) being represented with a dashed line.

The lower cylinder, or represented at the bottom of FIG. 1, includes an outer part corresponding to capacitor (2), which has an armature (2.1) on the top of the lower cylinder, electrically coupled with phase (A) by means of connection cable (4), while it has another armature (2.2), which is at the bottom of the lower cylinder electrically connected with armature (3'.2) by means of a coating (8) which connects electrically both armatures in spite of the insulation layer, in turn these armatures (2.2) and (3'.2) electrically connected are coupled with phase (C) by means of connection cable (6). The separation that exists between armatures (2.2) and (3'.2) when covered by an electrical conductive layer (8) which connects both armatures has been represented with a dashed line.

The inner parts of the upper and lower cylinder correspond to capacitors (3) and (3') respectively, each of them having armatures (3.1) and (3.2), and (3'.1) (3'.2) respectively. Armatures (3.1) and (3'.1) are connected to each other by means of connection cable (5) and at the same time with phase (B), while armatures (3.2) and (3'.2) are connected by means of connection cable (6).

The inner parts of each cylinder corresponding to capacitors (3) and (3') may have their axis (9) hollow, through whose interior connection cables can pass, thus in FIG. 1, where through hollow axis (9) only phase (B) connection cable has been passed, also connection cables (4) and (6) could have been passed.

Figure 3:
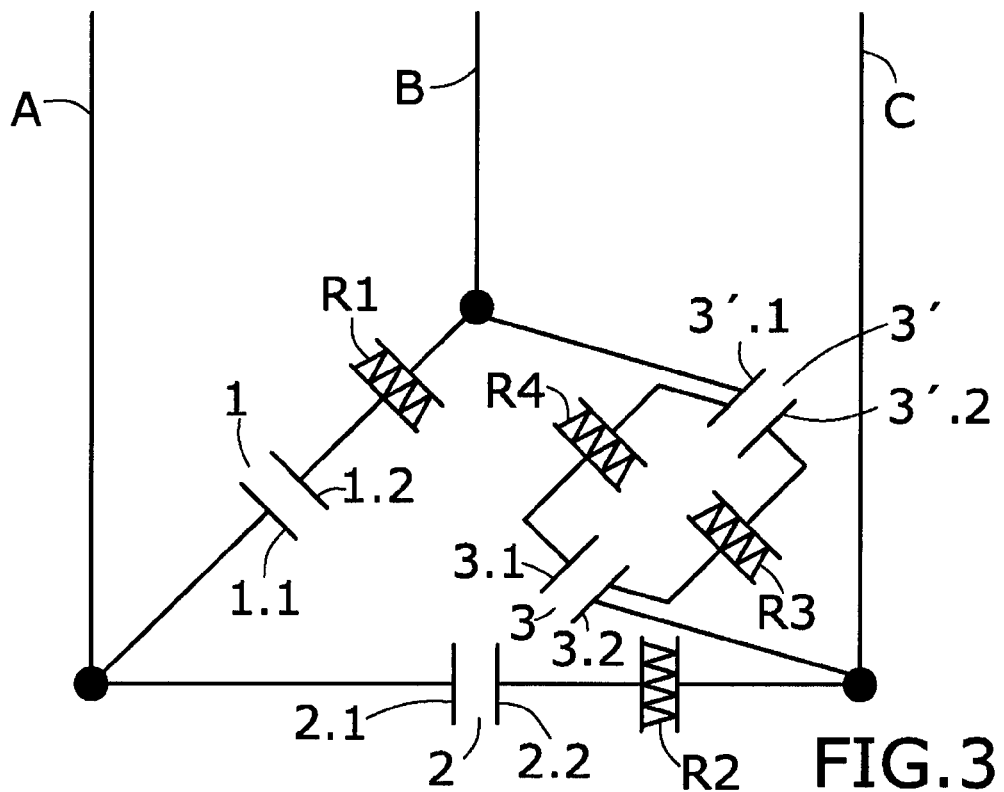
FIG. 3 shows an equivalent representation of FIG. 2 wherein the points where breakages or disconnections take place when there is an internal overpressure have been marked.
Figure 4:
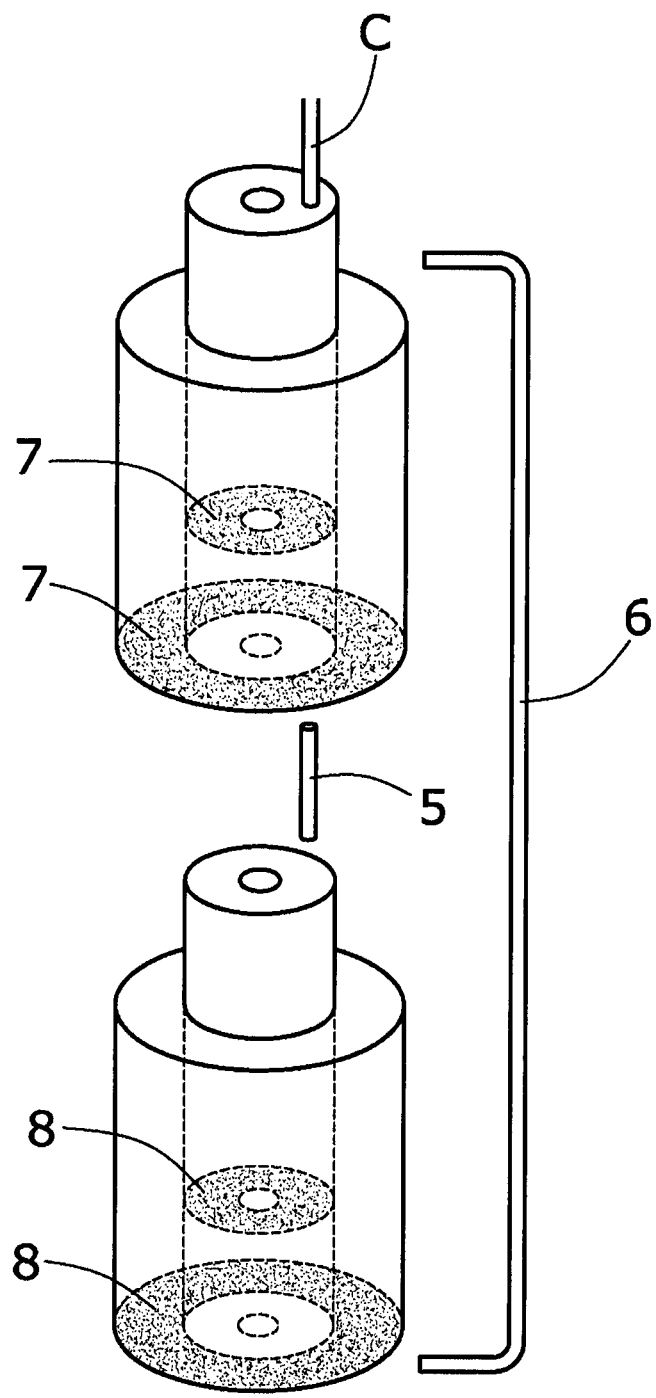
FIG. 4 shows a simplified representation of the movement that takes place in the inner parts of each cylinder in case of overpressure and the breakage of connections.
Figure 5:
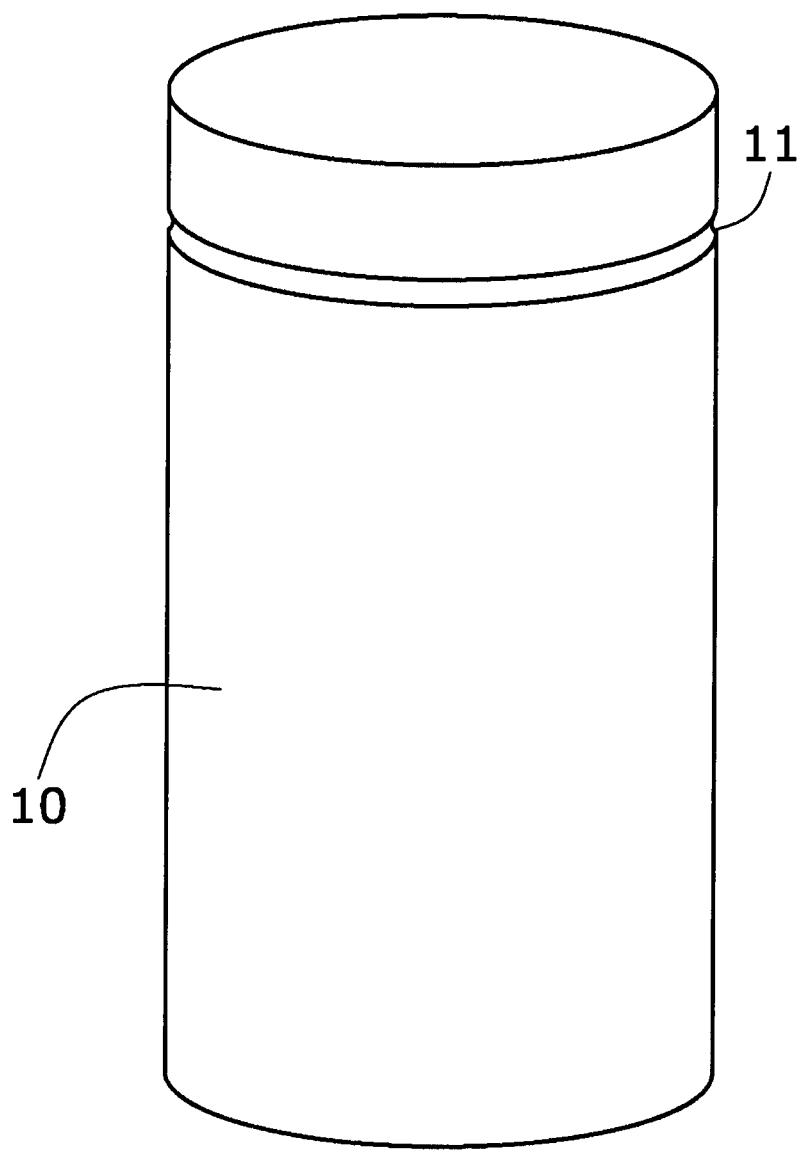
FIG. 5 shows a representation of the supplementary means of protection against internal overpressure.

In case of occurring an internal overpressure of the set of capacitors housed in aluminium can (10), as shown in FIG. 4, the displacement of capacitors (3) and (3') occurs, which corresponds to the inner parts of the cylinders, as can be seen in FIG. 3. This displacement of the inner parts of the cylinders produces several effects:

On the one hand, breakage (R1) of conductive coating layer (7) which connected armatures (3.1) and (1.2)
On the other hand, breakage (R2) of conductive coating layer (8) which connected armatures (2.2) and (3'.2).
Breakage (R3) of the connection of connection cable (6) with phase (C)
Breakage (R4) of the connection of cable (5).

Thanks to the movements of the inner parts with respect to the outer ones in case of internal overpressure, breakage of connections occurs leaving without connection to the outside of capacitors, making the capacitor object of the invention have an effective way of protection against internal overpressure.

This protection method is complemented with well-known protection means against internal overvoltage, consisting of making a perimeter recess (11) next to the top where connection terminals are housed with the outside, on the can of aluminium or any other material (10) where the three-phase power capacitor is housed, such that in case of an internal overpressure the displacement of the recessed part occurs by absorbing the excess of energy generated by the internal overpressure, preventing the explosion of the capacitor.

Sufficiently described the nature of the present invention, as well as how to put it into practice, it is noted that, in its essence, it may be put into practice in other embodiments which differ in detail from the one shown by way of example, and which will also have the protection that is claimed, provided that they do not alter, change or modify its fundamental principle.

The invention claimed is:

1. A three-phase capacitor formed by two aligned cylinders comprising:
    a first cylinder including an outer part which corresponds to a first outer capacitor (1) and an inner part which corresponds to a first inner capacitor (3);
    a second cylinder including an outer part which corresponds to a second outer capacitor (2) and an inner part which corresponds to a second inner capacitor (3');
    said first and second inner capacitors (3, 3') connected in parallel;
    wherein a value of said first and second inner capacitors (3, 3') connected in parallel equals a value of said first and second outer capacitors (1, 2);
    said first and second outer capacitors (1, 2) and said first and second inner capacitors (3, 3') connected in delta with phases (A), (B) and (C); and
    each of said first and second outer capacitor (1, 2) disposed adjacent and separated from said respective first and second inner capacitors (3, 3') by an insulating material which allows a displacement of said inner part of each of said first and second cylinders with respect to said outer part of each of said first and second cylinders in case of overpressure.

2. The three-phase capacitor formed by two cylinders aligned according to claim 1, further comprising:
    said first outer capacitor (1) including a first armature (1.1) and a second armature (1.2) connected to phases (A) and (B) respectively;
    said second outer capacitor capacitor (2) including a third armature (2.1) and a fourth armature (2.2) connected to phases (A) and (C) respectively;
    said first inner capacitor (3) including a fifth armature (3.1) and a sixth armature (3.2);
    said second inner capacitor (3') including a seventh armature (3'.1) and an eighth armature (3'.2);
    said fifth armature (3.1) and said sixth armature (3.2) connected in parallel to said seventh armature (3'.1) and said eighth armature (3'.2); and
    said fifth armature (3.1) and said sixth armature (3.2) and said seventh armature (3'.1) and said eighth armature (3'.2) connected to phases (B) and (C).

3. The three-phase capacitor formed by two aligned cylinders according to claim 2, wherein said first armature (1.1) is arranged along a top of said first cylinder, said second armature (1.2) is arranged along a bottom of said first cylinder, and said second armature (1.2) is connected electrically with said fifth armature (3.1) by means of a first conductive coating layer (7) which connects electrically both of said second and fifth armatures (1.2, 3.1) in spite of said insulating material.

4. The three-phase capacitor formed by two aligned cylinders according to claim 3, wherein said third armature (2.1) is arranged along a top of said second cylinder and is coupled electrically with phase (A) by means of a connection cable (4), said fourth armature (2.2) is arranged along a bottom of said second cylinder, said fourth armature (2.2) connected electrically with said eighth armature (3'.2) by means of a second conductive coating layer (8) which connects electrically both of said fourth and eighth armatures (2.2, 3'.2) in spite of said insulation material, and said fourth and eight armatures (2.2, 3'.2) electrically connected with phase (C) by means of a connection cable (6).

5. The three-phase capacitor formed by two aligned cylinders according to claim 4, wherein said fifth and seventh armatures (3.1, 3'.1) are connected to each other along with phase (B) by means of a connection cable (5) and, said sixth and eighth armatures (3.2, 3'.2) are connected by means of said connection cable (6).

6. The three-phase capacitor formed by two aligned cylinders according to claim 5, wherein said inner parts of said first and second cylinders corresponding to said first and second inner capacitors (3, 3') each define a hollow (9) aligned on an axis through which at least one of said connection cables (5, 6) pass.

7. The three-phase capacitor formed by two aligned cylinders according to claim 5, further comprising:
    said first and second cylinders housed in an aluminum can (10);
    said first and second inner capacitors (3, 3') displaceable relative to said respective first and second outer capacitors (1, 2) in response to an internal overpressure of said aluminum can (10); and
    wherein said displacement of said first and second inner capacitors (3, 3') causes a breakage of said first conductive coating layer (7), said second conductive coating layer (8), said connection cable (6), and said connection cable (5).

8. The three-phase capacitor formed by two aligned cylinders according to claim 2, wherein said first and second cylinders are housed in a metal can (10) which has a perimeter recess (11) next to a top where connection terminals are housed with the outside for serving as a supplementary means of protection against an internal overpressure.

\* \* \* \* \*